(12) United States Patent
Freeman

(10) Patent No.: US 6,570,360 B1
(45) Date of Patent: May 27, 2003

(54) SELF-SYNCHRONIZING AC SYNCHRONOUS DRIVER FOR DC BRUSHLESS MOTORS

(75) Inventor: John Jay Freeman, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/613,151

(22) Filed: Jun. 30, 2000

Related U.S. Application Data
(60) Provisional application No. 60/141,623, filed on Jun. 30, 1999.

(51) Int. Cl.[7] ............................... H02P 5/28; H02P 7/36
(52) U.S. Cl. ..................................... 318/798; 388/928.1
(58) Field of Search ....................... 318/459, 500, 318/798; 388/928.1, 805

(56) References Cited

U.S. PATENT DOCUMENTS

| 5,227,709 | A | * | 7/1993 | Gauthier et al. ............ 318/685 |
| 5,233,275 | A | | 8/1993 | Danino ........................ 318/254 |
| 5,276,662 | A | | 1/1994 | Shaver, Jr. et al. ........... 369/32 |
| 5,466,999 | A | | 11/1995 | Hutsell ........................ 318/431 |
| 5,600,217 | A | | 2/1997 | Bartlett ........................ 318/434 |
| 5,631,999 | A | * | 5/1997 | Dinsmore ..................... 388/805 |
| 5,633,568 | A | | 5/1997 | Dunfield ....................... 318/254 |
| 5,691,856 | A | | 11/1997 | Kardash .................... 360/73.03 |
| 5,777,449 | A | | 7/1998 | Schlager ...................... 318/459 |
| 5,866,998 | A | | 2/1999 | Menegoli ..................... 318/254 |
| 6,040,671 | A | * | 3/2000 | Brito et al. ............... 388/928.1 |
| 6,054,825 | A | * | 4/2000 | Hayner ........................ 318/459 |
| 6,094,020 | A | * | 7/2000 | Goretzki et al. ............. 318/500 |

* cited by examiner

Primary Examiner—Marlon T. Fletcher
(74) Attorney, Agent, or Firm—Merchant & Gould P.C.

(57) ABSTRACT

A method and system for driving a phase of an electrical motor are disclosed. The method and system detect the back electromotive force being generated by a coil. The back electromotive force is amplified or attenuated to a level necessary to drive the motor at a desired speed and is fed back into the coil. The detected back electromotive force signal that drives the motor is proportional to, in phase with, and at the same frequency as the back electromotive force signal being generated by the coil. Using the back electromotive force to produce the drive signal permits autosynchronization of the drive signal without use of position sensors and reduces acoustic noise and velocity modulation associated with sudden torque shifts.

4 Claims, 4 Drawing Sheets

SELF-SYNCHRONIZING AC SYNCHRONOUS DRIVER FOR DC BRUSHLESS MOTORS

RELATED APPLICATIONS

This application claims the benefit of the filing date of U.S. Provisional Patent Application Serial No. 60/141,623 filed on Jun. 30, 1999 and entitled "SELF-SYNCHRONIZING AC SYNCHRONOUS DRIVER FOR DC BRUSHLESS MOTOR."

FIELD OF THE INVENTION

This application relates to hard disc drives and more particularly to an apparatus and method for detecting the back electromotive force (BEMF) signal of the spindle motor and using that BEMF signal to generate a spindle motor drive signal.

BACKGROUND OF THE INVENTION

In a disc drive, data is recorded on a disc in concentric, circular paths known as tracks. Servo bursts are written in each track on the disc and contain position information. During operation the disc continually rotates and a read/write head a given radius from the center of the disc reads or writes data in a given track. An actuator arm swings the head in an arc across the disc surface to allow the head to read or write data in different tracks.

The disc must rotate at a nearly constant angular velocity so that the data can properly be read from the disc. The data is written while the disc rotates at the same nearly constant angular velocity so the timing of the read process mimics the timing of the write process. To provide the nearly constant angular velocity, a spindle motor is used and usually takes the form of a direct current (DC) brushless motor. DC brushless motors often have multiple coils or phases and each phase must be energized or commutated at the appropriate time and with the appropriate current orientation and amplitude. Furthermore, the amount of voltage dropped across each coil must be tightly controlled to maintain the constant velocity.

A common mode of operating a DC brushless motor is the bipolar operating mode using stepped driving signals. In this mode for a three phase motor, at any given time two coils are energized and one coil floats. A six step drive signal is applied to each coil, two steps on, then one off, then two in the reverse, and then one back off. The timing of these signal steps must be correct for the motor to properly rotate in the desired direction and at the desired velocity.

The DC brushless motor's coils generate a BEMF as they rotate through magnetic fields. As each phase rotates between separate stator fields, the BEMF signal behaves similarly to a sinusoid as it decreases to zero and then switches polarity and increases back to its peak. Thus, comparators can be used to determine when the BEMF signal crosses zero potential, and the stepped drive signal is timed so that the zero step occurs when the BEMF signal crosses zero. The peak value of the BEMF signal also indicates the velocity of the motor and can be sampled to maintain the proper velocity by altering the current provided to the motor in response to a BEMF peak that is too high or low. This system achieves a nearly constant velocity but the velocity modulates due to a torque ripple associated with the switching of the drive current steps.

To help minimize undesirable torque ripple, which alters the velocity of the motor, and to minimize related acoustic noise, sinusoidal drive currents are applied to the phases instead of the normal six steps. The sinusoid must properly be in phase with the motor's rotation. Hall sensors, resolvers, and feedback encoders can be used to sense the motor's position and to determine the timing of the application of the sinusoid. However, these devices add significant expense and bulk to the motor. Additionally, the sinusoidal drive current is usually derived from values in a lookup table that occupies valuable memory space. Although torque ripple is decreased, some still exists because the drive signals cannot account for mechanical differences between each coil in the motor that gives each coil a unique BEMF signal with harmonic distortion. The unique BEMF signal alters the voltage that must be dropped across each coil to maintain a constant velocity, and the unique BEMF signal causes each coil to respond differently to the generic drive signals being applied.

SUMMARY OF THE INVENTION

These problems are addressed by the present in methods and systems that provide autosynchronization of the drive signal with the motor's rotational position without using position sensors. The present invention's methods and systems also reduce velocity modulation and acoustic noise associated with torque ripple and save memory space by driving the motor's coil with a drive signal created from amplification of the back emf signal. The drive signal is proportional to, in phase with, and at the same frequency as the back electromotive force being produced by the motor's coil.

A method implementing the present invention drives the phase of an electrical motor by executing several steps. A back electromotive force being generated by the motor coil is detected. This back electromotive force is amplified to produce a drive signal that is fed back to the motor's coil. This drive signal is proportional to the back electromotive force and has sufficient amplitude to also overcome the resistive losses of the motor. The drive signal is in phase with and at the same frequency as the back emf of the coil and is therefore, automatically in synchronization with the motor's rotational position.

A control system implementing the present invention is configured to detect the back emf with a detection circuit and amplify it to overcome losses in the coil before sending it to the coil as a drive signal. An exemplary detection circuit contains several difference amplifiers that find the total voltage on the coil, the total resistive loss voltage dropped across the coil, and the difference between the total voltage and the resistive loss voltage, which is the back emf. The back emf is fed to a gain controller which produces a signal that is proportional to the back emf signal and also has an amplitude that is sufficient to produce a drive signal that overcomes the coil's resistive losses.

These and various other features as well as advantages which characterize the present invention will be apparent from a reading of the following detailed description and a review of the associated drawings.

DETAILED DESCRIPTION

A disc drive contains several elements that cooperate to maintain the angular velocity of the spindle motor coupled to the storage medium. For an exemplary disc drive embodiment of the present invention, a detection circuit that isolates the BEMF of each coil being driven is included. A control system receives the BEMF signal provided by a coil of the spindle motor and generates a drive signal for that coil that is in phase with and is proportional to the BEMF signal. This control system utilizes the BEMF signal to properly drive the motor at a constant velocity with minimized torque ripple and acoustic noise.

Figure 1:
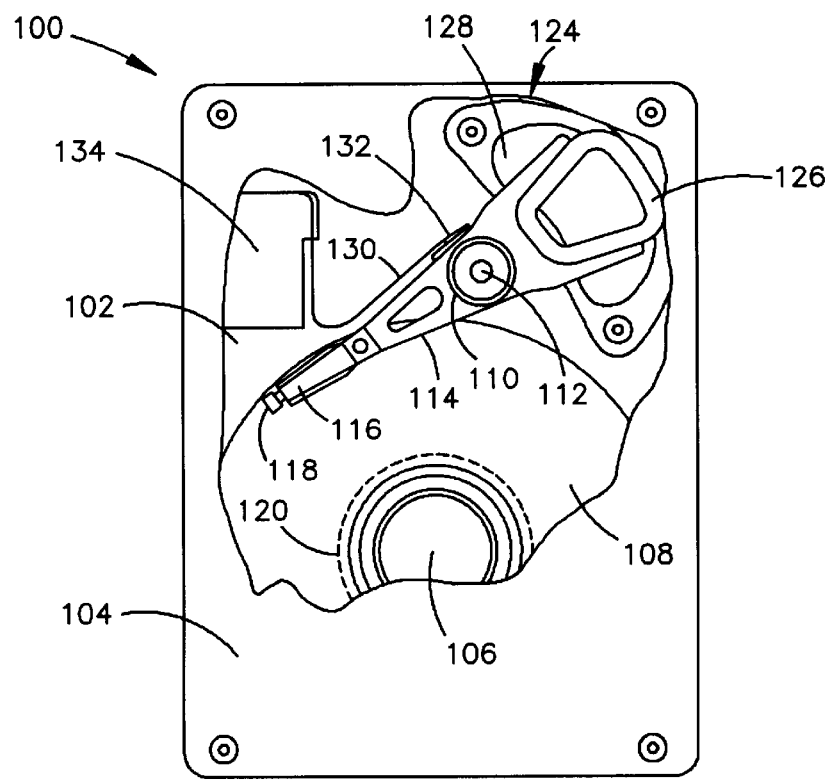
FIG. 1 is a schematic representation of a disc drive in which preferred embodiments of the invention operate.

A disc drive 100 constructed in accordance with a preferred embodiment of the present invention is shown in FIG. 1. The disc drive 100 includes a base 102 to which various components of the disc drive 100 are mounted. A top cover 104, shown partially cut away, cooperates with the base 102 to form an internal, sealed environment for the disc drive in a conventional manner. The components include a spindle motor 106, typically 3 or more phases, which rotates one or more discs 108 at a constant high speed in response to an appropriately generated drive signal. Information is written to and read from tracks on the discs 108 through the use of an actuator assembly 110, which rotates during a seek operation about a bearing shaft assembly 112 positioned adjacent the discs 108. The actuator assembly 110 includes a plurality of actuator arms 114 which extend towards the discs 108, with one or more flexures 116 extending from each of the actuator arms 114. Mounted at the distal end of each of the flexures 116 is a head 118 which includes an air bearing slider enabling the head 118 to fly in close proximity above the corresponding surface of the associated disc 108.

During a seek operation, the track position of the heads 118 is controlled through the use of a voice coil motor (VCM) 124, which typically includes a coil 126 attached to the actuator assembly 110, as well as one or more permanent magnets 128 which establish a magnetic field in which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the heads 118 are caused to move across the surfaces of the discs 108.

The spindle motor 116 is typically de-energized when the disc drive 100 is not in use for extended periods of time. The heads 118 are moved over park zones 120 near the inner diameter of the discs 108 when the drive motor is de-energized. The heads 118 are secured over the park zones 120 through the use of an actuator latch arrangement, which prevents inadvertent rotation of the actuator assembly 110 when the heads are parked.

A flex assembly 130 provides the requisite electrical connection paths for the actuator assembly 110 while allowing pivotal movement of the actuator assembly 110 F during operation. The flex assembly includes a printed circuit board 132 to which head wires (not shown) are connected; the head wires being routed along the actuator arms 114 and the flexures 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base deck 102 to a disc drive printed circuit board (not shown) mounted to the bottom side of the disc drive 100.

Figure 2:
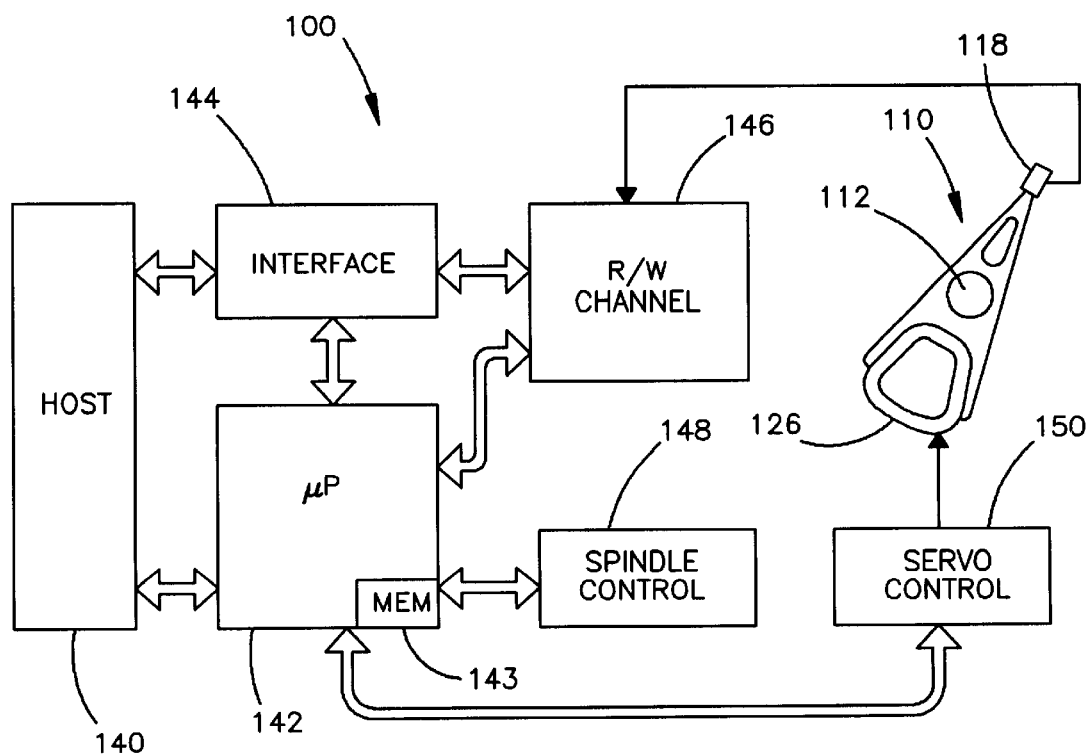
FIG. 2 illustrates a disc drive system connected to a host for the disc drive of FIG. 1.

Referring now to FIG. 2, shown therein is a functional block diagram of the disc drive 100 of FIG. 1, generally showing the main functional circuits which are resident on the disc drive printed circuit board and used to control the operation of the disc drive 100. The disc drive 100 is shown in FIG. 2 to be operably connected to a host computer 140 in which the disc drive 100 is mounted in a conventional manner. Control communication paths are provided between the host computer 140 and a disc drive microprocessor 142, the microprocessor 142 generally providing top level communication and control for the disc drive 100 in conjunction with programming for the microprocessor 142 stored in microprocessor memory (MEM) 143. The MEM 143 can include random access memory (RAM), read only memory (ROM) and other sources of resident memory for the microprocessor 142.

The discs 108 are rotated at a constant high speed by a spindle control circuit 148, including a speed control loop shown in FIG. 4 below, that electrically commutates the spindle motor 106 (FIG. 1) in response to a BEMF signal provided by a detection circuit described below with reference to FIG. 3. During a seek operation, the track position of the heads 118 is controlled through the application of current to the coil 126 of the actuator assembly 110. A servo control circuit 150 provides such control. During a seek operation the microprocessor 142 receives information regarding the velocity of the head 118, and uses that information in conjunction with a velocity profile stored in memory 143 to communicate with the servo control circuit 150, which will apply a controlled amount of current to the voice coil motor 126, thereby causing the actuator assembly 110 to be pivoted.

Data is transferred between the host computer 140 and the disc drive 100 by way of a disc drive interface 144, which typically includes a buffer to facilitate high speed data transfer between the host computer 140 and the disc drive 100. Data to be written to the disc drive 100 are thus passed from the host computer to the interface 144 and then to a read/write channel 146, which encodes and serializes the data and provides the requisite write current signals to the heads 118. To retrieve data that has been previously stored by the disc drive 100, read signals are generated by the heads 118 and provided to the read/write channel 146, which outputs the retrieved data to the interface 144 for subsequent transfer to the host computer 140. Such operations of the disc drive 100 are well known in the art and are discussed, for example, in U.S. Pat. No. 5,276,662 issued Jan. 4, 1994 to Shaver et al.

The spindle motor used to rotate the storage medium is typically three or more phases and a three phase motor and accompanying detection circuit and control system will be described herein for exemplary purposes. FIG. 3 illustrates the BEMF detection circuit 200 for one phase of the three phase motor. It should be noted that each detection circuit for each phase is identical except where noted. FIG. 3 shows three drivers 202, 204, and 206 that provide the current drive or voltage drive to the three coils 214, 216, and 218 of the DC brushless motor 226.

Once the motor 226 is rotating, BEMF is being generated and the voltage supplied to the motor must sufficiently overcome the BEMF to induce current into the desired coil. Current must be induced into the desired coil to provide torque which overcomes losses of the motor such as friction. Compensating for the BEMF and the internal losses allows the motor to maintain a constant velocity. Another factor in determining the total voltage applied to the coil in addition to the BEMF and the current times resistance drop is the di/dt voltage drop resulting from the motor's reactance. However, this factor is negligible because of the low frequency of the drive current resulting from the relatively low frequency of the motor's rotation (typically around 5400 rpm).

To drive a coil based on the BEMF that it generates, the BEMF of that coil must be isolated. Isolating the BEMF requires finding the total voltage applied to the coil and then removing the current times resistance (I·R) component. The BEMF detection circuit 200 of FIG. 3 is included in the system electronics to isolate the BEMF. The circuit 200 permits autosynchronization and waveform generation without using costly memory space and without using Hall sensors, resolvers, or encoder feedback. The circuit 200 also allows the control system to generate a waveform that is in phase and proportional to the BEMF signal which eliminates torque ripple, harmonics, and related acoustic noise.

The driver circuit 202 for phase A feeds power through coil 216 of spindle motor 226. The current provided to coil 216 flows through a sense resistor 208. The current flows through coil 216 corresponding to the A phase of the motor and the current continues through a virtual ground center tap 244 connecting all three coils. Similarly, current is fed from driver circuit 204 through sense resistor 210 and coil 214 for phase B. Current from driver circuit 206 is fed through sense resistor 212 and coil 218 for phase C.

A resistive network including resistors 220, 222, and 224 is wired in parallel with the motor's coils. This resistive network has a virtual ground center tap 242 connecting the three resistors in the same fashion the motor coils 214, 216, and 218 are attached. The resistive network is provided because the potential at the motor's real center tap 244 is needed as a reference voltage but a physical connection to this center tap 244 is often not provided on the motor 226. The resistive network's virtual ground center tap 242 provides essentially the same reference potential as the motor's and the resistive network's center tap 242 is easily accessed.

To detect the BEMF generated by phase A, the total voltage provided across coil 216 must be found. A measurement of this potential can be accomplished by connecting the output of the driver circuit 202 for phase A to an input of an difference amplifier 246 in first amplifier circuit 230. The output of the driver circuit 202 can be directly connected to the difference amplifier 246 without regard for the drop across the sense resistor 208 because this resistor's value is very low, and is typically one ohm. The virtual ground center tap 242 of the resistive network is connected to the other input to the operation amplifier 246. This phase voltage amplifier circuit 230 has unity gain so the potential of the output signal is equal to the potential across phase A of motor 226. As will be discussed below, the output is fed to an input of difference amplifier 250 of third amplifier circuit 240.

The sense resistor 208 causes a small voltage drop relative to the voltage dropped across the coil 216. One end of the sense resistor is connected to one input of difference amplifier 248 in second amplifier circuit 228, and the other end of the sense resistor is connected to the other input of difference amplifier 248. Thus, the difference between the inputs of difference amplifier 248 is equal to the voltage dropped across the sense resistor 208. From this voltage drop, the current passing through coil 216 and phase A is found. The second amplifier circuit's gain is set to the resistance of coil 216 divided by the resistance of sense resistor 208. In embodiments where the sense resistor 208 is 1 ohm, the gain of amplifier 248 is equal to the resistance of coil 216. Thus, this second amplifier circuit, in effect, divides the voltage across the sense resistor 208 to find the current through the coil and then multiplies that current by the motor coils resistance to output the I·R voltage drop through that coil.

The potential of the output of second amplifier circuit 228, I·R, is equal to the potential dropped across the motor coil 216 because of resistive losses such as friction. The current induced through the coil 216 must be sufficient to counteract those resistive losses and maintain the motor's velocity. This output representative of the resistive voltage drop is fed to an input of difference amplifier 250 in the third amplifier circuit 240.

The difference amplifier 250 of the third amplifier circuit 240 receives the total voltage applied to the coil 216 at one terminal and the voltage applied to the coil 216 to overcome resistive losses as the other terminal. The output of the third amplifier circuit 240 is the total voltage less the voltage due to resistive losses. This output voltage is equal to the BEMF generated by coil 216. The output is fed to a control circuit shown in FIG. 4 and discussed below to control the signal provided to the driver circuit 202.

Although only the amplifier circuits for phase A are shown, phase B and phase C have identical circuits that produce a BEMF signal corresponding to coil 214 and a BEMF signal corresponding to coil 218, respectively. These BEMF signals are also fed to a control circuit to control the signal provided to the driver circuits 204 and 206. Although analog devices are shown for deriving the BEMF signal for the phase, this process could be done digitally utilizing hardwired or programmable logic circuitry as well. Typically, the driver circuits 202, 204, and 206 contain half H bridge transistor configurations used to source and sink current to and from the motor's coils. FIG. 4 illustrates an exemplary spin speed control loop for the spindle motor of a disc drive implementing the present invention. Generally, the spin speed control loop is well known in the art. This control loop maintains the velocity of the spindle motor 322 to ensure proper read and write timing for the disc drive. A reference voltage 302 is generated by the disc drive's electronics and is fed to a summing amplifier 304. The reference voltage 302 has a value that represents the target rotational velocity of the spindle motor 322.

A speed sensor 324 detects the motor's current rotational velocity by techniques well known in the art. The speed sensor 324 could also determine the rotational velocity be measuring the peak value of the BEMF signal provided by the detection circuit 200. The output of the speed sensor 324 is a voltage representative of the current velocity of the motor. This output is also fed to summing amplifier 304 which generates an output voltage representative of the velocity error. The output of the summing amplifier 304 is fed to a lead-lag compensator 308.

The lead-lag compensator 308 accounts for system delays in responding to error signals provided by the summing amplifier 304. The motor cannot instantaneously jump from its current velocity to the target velocity according to the error signal being generated. The lead-lag compensator properly times the error signal that is provided to the driver 310 so that the motor has time to adjust its velocity according to a previous error signal before a new error signal is provided.

Figure 3:
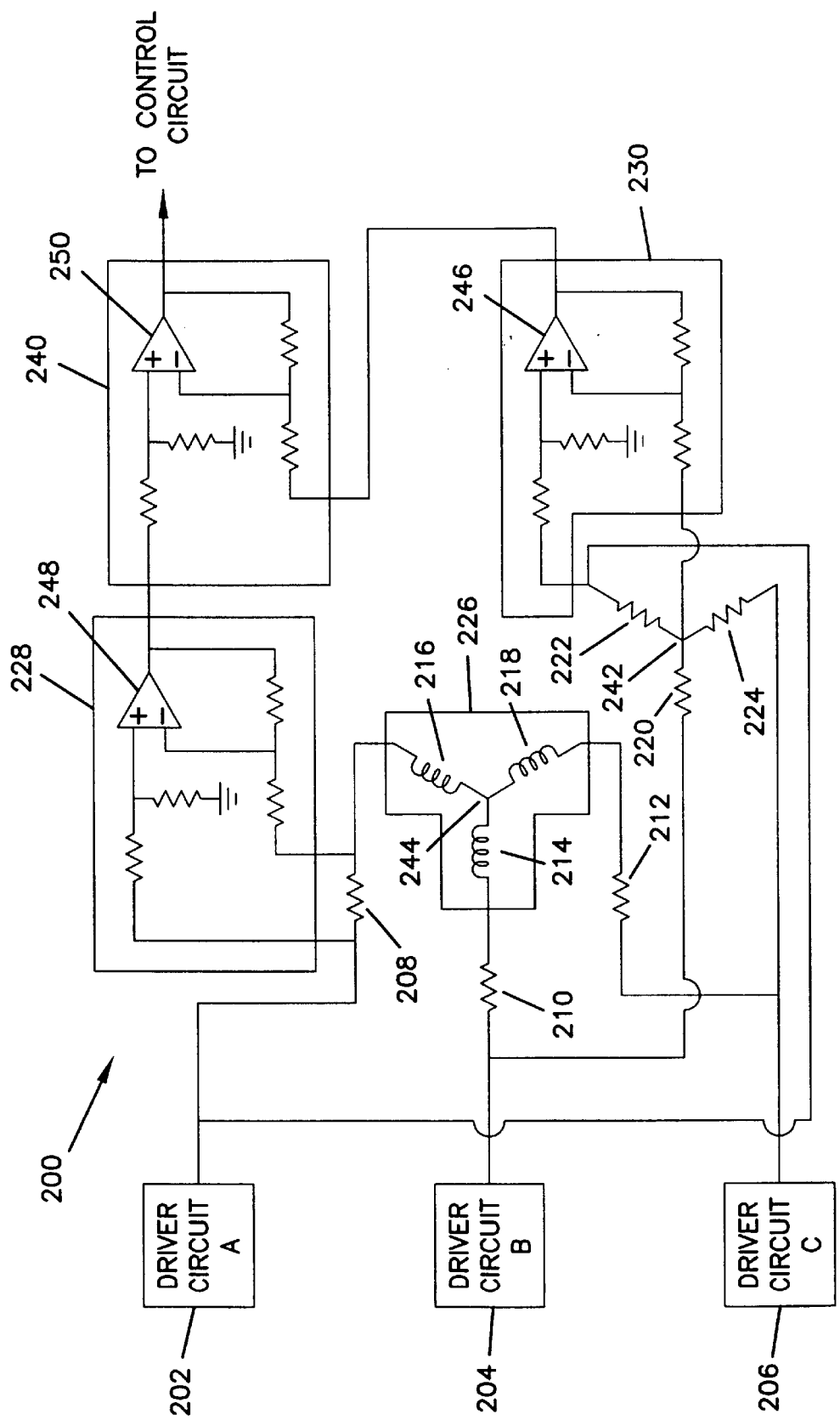
FIG. 3 depicts an exemplary BEMF detection circuitry for one phase of a three phase spindle motor of the disc drive of FIG. 1.
Figure 4:
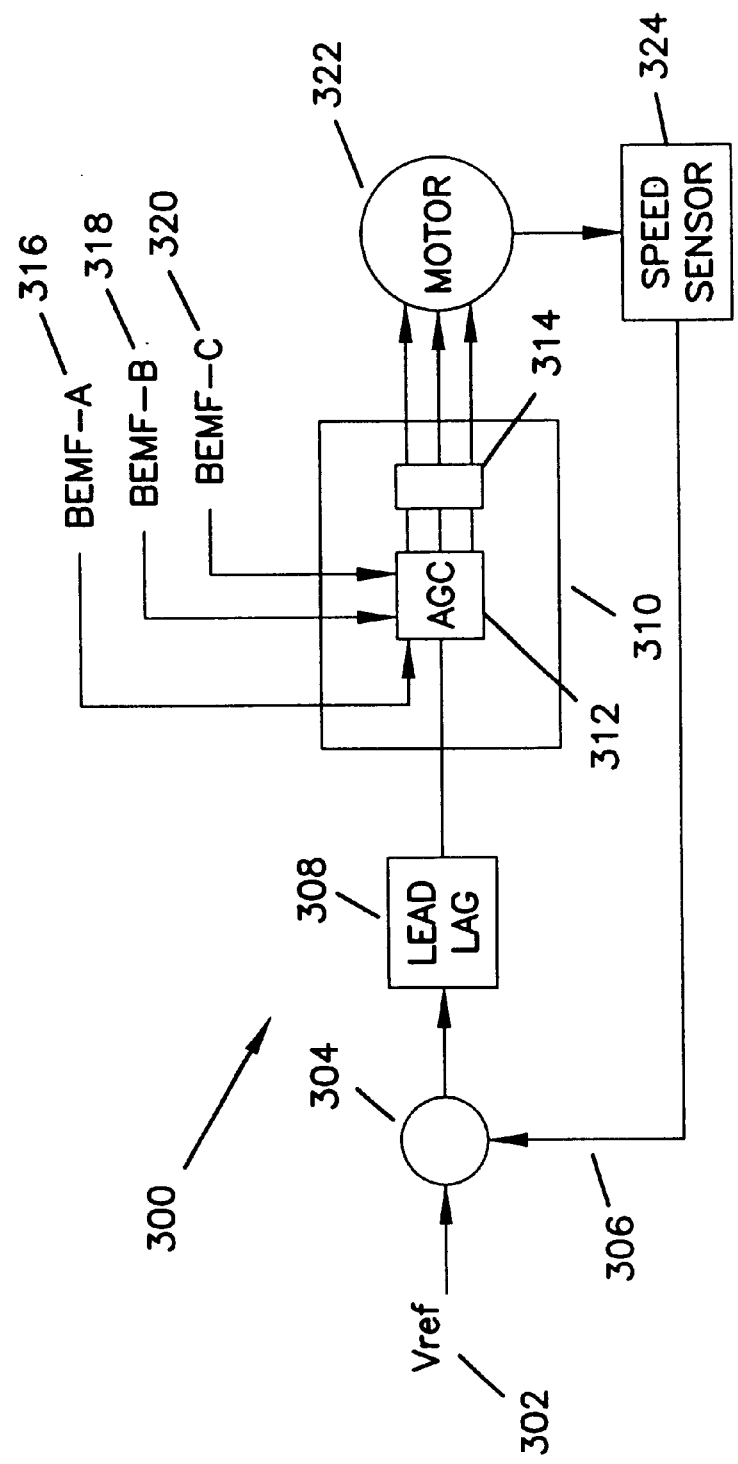
FIG. 4 illustrates the spin speed control loop of the disc drive of FIG. 1 that utilizes the BEMF signal from a coil of the spindle motor to generate that coil's drive signal.

The driver 310 contains an automatic gain control circuit (AGC) 312 and driver circuitry 314 corresponding to the power driver circuits 202, 204, and 206 of FIG. 3. The AGC 312 receives the error signal from the lead-lag compensator 308 as well as receiving the BEMF signals 316, 318, and 320 from the detection circuits for phases A, B, and C. The BEMF signals replace the sine wave recreated from the lookup table by previous systems. The AGC amplifies or attenuates the BEMF signals as commanded by the error voltage generated by the summing amplifier 304 and lead lag network 308 to determine the proper gain for the driver circuitry 314. The gain must properly be set so that the drive signal provided to the coils will have an amplitude that effectively corrects the speed of the motor. The BEMF signals are fed to the driver circuitry 314 and the driver circuitry amplifies the BEMF signals to a level set by the AGC to correct the motor's velocity by producing drive signals that are in phase with, at the same frequency as, and proportional to the corresponding BEMF signals being produced. The drive signals are fed to the motor's coils which continue to generate BEMF that is extracted by the detection circuit 200 and continuously fed back to the AGC 312.

The result is a drive signal that is automatically synchronized with the motor's rotation without directly detecting the motor's rotational position. The resulting drive signal also matches the harmonics and other distortions of the BEMF waveform which eliminate sudden torque shifts. The torque ripple is removed and velocity modulation and acoustic noise are virtually eliminated. Using all analog devices in the detection circuit, memory space in the disc drive electronics is freed.

Although torque ripple is removed, this system does not compensate for the detent torque associated with the motor. Therefore, a motor designed with low detent torque is preferred. Such motors are readily available. This system also requires that an additional start-up circuit be provided. The motor must be rotating to produce BEMF and the circuit described herein must receive the BEMF signal to properly drive the motor. Typically, once the motor reaches about 10% of its operating speed, sufficient BEMF is being generated. This percentage is dependent upon the amount of gain provided by the AGC. Therefore, a start-up circuit that can start the motor's rotation from a dead stop is necessary. Such start-up circuits are well known in the art. Typically, these startup circuits electrically communicate with the driver circuits 202, 204, and 206 until sufficient speed is reached and then the driver circuits are controlled by the spin speed control loop's interaction with the detection circuit 200.

Figure 5:
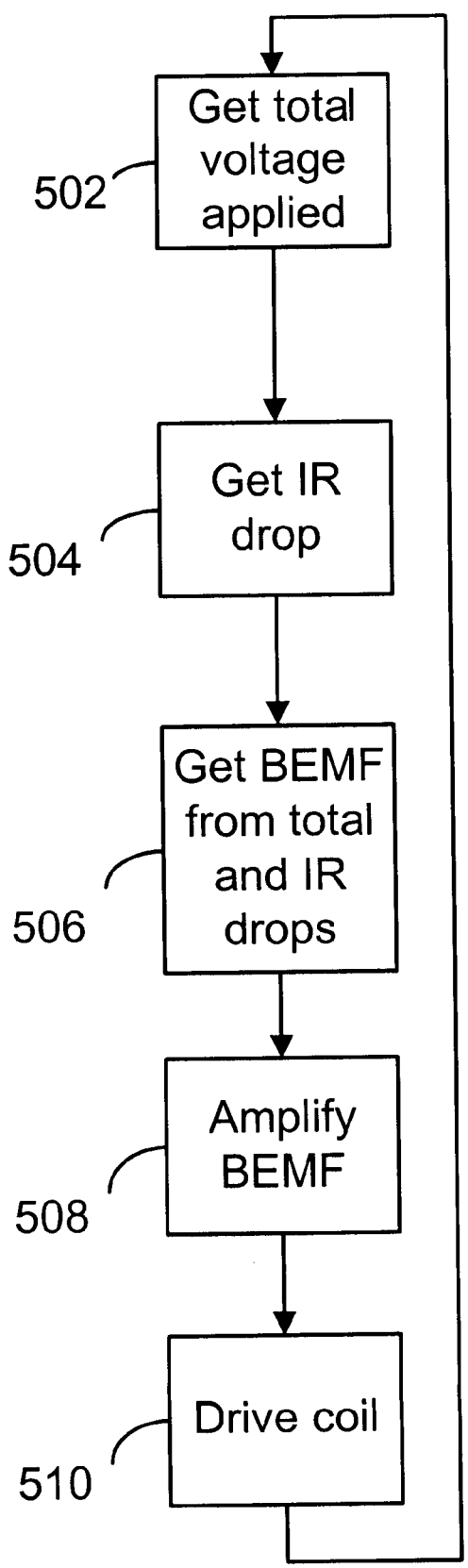
FIG. 5 illustrates the operational flow of the BEMF detection circuitry and the spin speed control.

A method implementing the present invention drives the phase of an electrical motor 226 by executing several steps shown in FIG. 5. A back electromotive force being generated by the motor coil is detected at operations 502, 504, and 506. At total voltage operation 502, the total voltage applied to the motor's coil is found with reference to the resistive network's centertap 244 and the driver circuit's output. At resistive loss operation 504, the resistive loss voltage dropped across the motor's coil is found by measuring the current through the sense resistor 208 and scaling that current value by the coil's resistance divided by the sense resistor's resistance to find the voltage drop. The back electromotive force is found at BEMF operation 506 by taking the difference between the total voltage and the resistive loss voltage. Amplify operation 508 amplifies the BEMF to produce a drive signal that is fed back to the motor's coil at step 510. This drive signal is proportional to the back electromotive force and has sufficient amplitude to also overcome the resistive losses of the motor. The drive signal is in phase with and at the same frequency as the back emf of the coil and is therefore, automatically in synchronization with the motor's rotational position.

A control system implementing the present invention is configured to detect the back emf with a detection circuit 200 and amplify it with a drive circuit 310 to overcome losses in the coil before sending it to the coil as a drive signal. An exemplary detection circuit 200 contains several difference amplifiers 228, 230, 240 that find the total voltage on the coil, the total resistive loss voltage dropped across the coil, and the difference between the total voltage and the resistive loss voltage, which is the back emf. The back emf is fed to a gain controller 312 in an exemplary drive circuit 310 which produces a gain signal that is proportional to, in phase with, and at the same frequency as the back emf signal and also has an amplitude that is sufficient to produce a drive signal with a driver circuit 202 that overcomes the coil's resistive losses.

It will be clear that the present invention is well adapted to attain the ends and advantages mentioned as well as those inherent therein. While preferred embodiments have been described for purposes of this disclosure, numerous changes may be made which will readily suggest themselves to those skilled in the art and which are encompassed in the spirit of the invention disclosed and as defined in the appended claims.

What is claimed is:

1. A method for driving a phase of an electrical spindle motor driving a data storage disc in a disc drive, the method comprising steps of:
    a) detecting a back electromotive force being generated by a coil of the phase by:
        a)(i) measuring a total voltage applied to the phase of the motor;
        a)(ii) measuring a resistive loss voltage dropped across the phase of the motor; and
        a)(iii) detecting the back electromotive force by finding a difference between the total voltage and the resistive loss voltage;
    b) amplifying the back electromotive force; and
    c) driving the phase with the amplified back electromotive force, wherein the disc drive includes a first difference amplifier circuit having unity gain with inputs connected across the coil of the motor, and wherein step a)(i) comprises a step of applying the total voltage across the inputs of the first difference amplifier circuit, wherein the disc drive includes a sense resistor connected in series with the coil and a second difference amplifier circuit with inputs connected to each side of the sense resistor, wherein a gain of the second difference amplifier circuit is equal to a resistance of the coil divided by a resistance of the sense resistor, and wherein step a)(ii) comprises a step of applying a sense resistor voltage drop across the inputs of the second difference amplifier circuit.

2. The method of claim 1, wherein the disc drive includes a third difference amplifier circuit having one input connected to an output of the first difference amplifier circuit and having another input connected to an output of the second difference amplifier circuit, and wherein step a)(iii) comprises a step of applying an output voltage of the first difference amplifier circuit and an output voltage of the second difference amplifier circuit across the inputs of the third difference amplifier circuit.

3. A control system for driving a phase of an electrical motor, comprising:

a detection circuit that measures a back electromotive force being generated by a coil of the phase by measuring a total voltage applied to the phase of the motor, measuring a resistive loss voltage dropped across the phase of the motor by detecting a value of an electrical current passing through a coil of the phase and by scaling the value of the electrical current by the resistance of the coil to measure the resistive loss voltage, and detects the back electromotive force by finding a difference between the total voltage and the resistive loss voltage, wherein the detection circuit comprises a first difference amplifier circuit having unity gain and having a first input connected to one side of the coil and having a second input connected to a second side of the coil, wherein an output of the first amplifier circuit is equal to the total voltage across the phase, a sense resistor electrically connected in series with the coil; and a second difference amplifier circuit having a first input connected to a first end of the sense resistor and a second input connected to a second end of the sense resistor, the second difference amplifier circuit having a gain equal to a resistance of the coil divided by a resistance of the sense resistor, and wherein an output of the second difference amplifier circuit is equal to the resistive loss voltage drop of the coil; and a drive circuit that amplifies or attenuates the back electromotive force and drives the coil of the motor with the amplified or attenuated back electromotive force.

4. The control system of claim 3 wherein the detection circuit further comprises a third difference amplifier circuit having a first input connected to the output of the first difference amplifier circuit, the third difference amplifier circuit having a second input connected to the output of the second difference amplifier circuit, and wherein an output of the third difference amplifier circuit is equal to the back electromotive force being generated by the coil.

* * * * *